United States Patent [19]
McMaster et al.

[11] 3,957,479
[45] May 18, 1976

[54] GLASS TREATING FURNACE

[76] Inventors: Harold A. McMaster, 707 Riverside Drive, Woodville, Ohio 43469; Norman C. Nitschke, 9102 Buck Road, Perrysburg, Ohio 43551

[22] Filed: Jan. 20, 1975

[21] Appl. No.: 542,152

Related U.S. Application Data

[60] Division of Ser. No. 435,130, Jan. 21, 1974, Pat. No. 3,907,132, and a continuation-in-part of Ser. No. 365,939, June 1, 1973, abandoned.

[52] U.S. Cl................................... 65/350; 65/349; 432/64; 432/126; 432/145; 432/176; 432/185; 432/250
[51] Int. Cl.²..................................... C03B 29/04
[58] Field of Search................ 65/349, 350; 432/56, 432/64, 126, 74, 145, 176, 185, 250

[56] References Cited
UNITED STATES PATENTS

| | | | |
|---|---|---|---|
| 1,311,286 | 7/1919 | Munhollon | 432/176 |
| 1,868,824 | 7/1932 | Grapp | 432/176 |
| 2,089,250 | 8/1937 | Cone | 432/145 |
| 2,664,838 | 1/1954 | Sorensen | 432/250 |
| 2,819,889 | 1/1958 | Dany | 432/64 |
| 2,841,925 | 7/1958 | McMaster | 65/350 |

*Primary Examiner*—Arthur D. Kellogg
*Attorney, Agent, or Firm*—Reising, Ethington, Barnard, Perry & Brooks

[57] ABSTRACT

A furnace for treating glass sheet material and the like in a glass tempering system. The furnace includes an upper glass treating zone and a lower gas treating and distributing zone for homogenizing gases of different temperatures to minimize exposure of the sheet being treated in the treating zone to uneven temperatures. Diametrically opposed inlets and outlets are provided in the side walls controlled by doors, and a slot in the top wall extends between the inlets and outlets to permit movement of a material carrier through the furnace. A pressure chamber communicates with the slot to cool conveyor elements at the top of the furnace, and also to provide a pressure barrier resisting the escape of gases from the furnace through the slots. Air curtains impinge on the tops of the doors in their closed positions to reduce leakage at the top of the doors.

33 Claims, 12 Drawing Figures

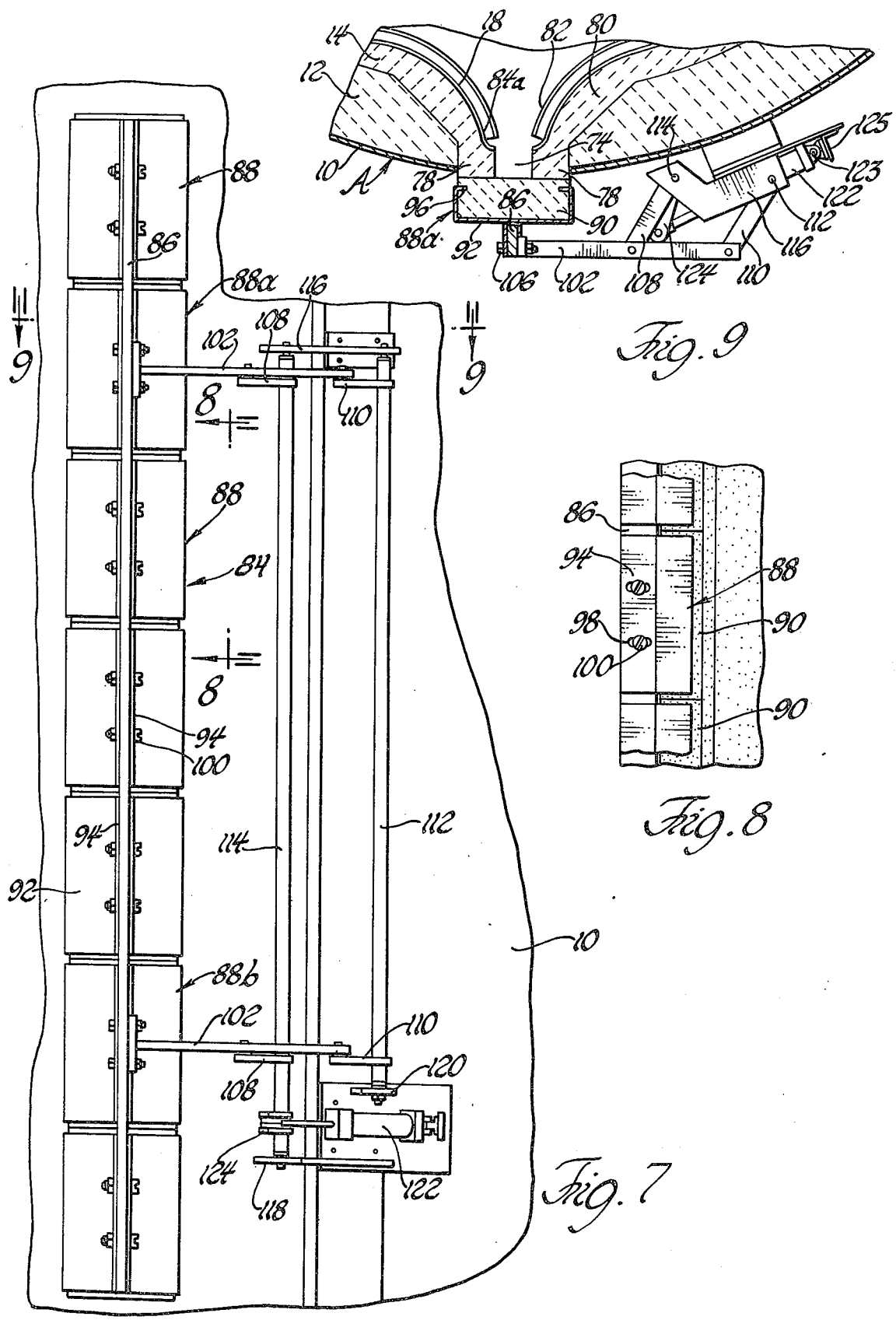

GLASS TREATING FURNACE

This application is a division of application Ser. No. 435,130, filed Jan. 21, 1974, now U.S. Pat. No. 3,907,132, the latter application and being a continuation-in-part of application Ser. No. 365,939, filed June 1, 1973, now abandoned. The entire disclosures of application Ser. No. 435,130 and application Ser. No. 365,939 are incorporated herein by reference.

This invention relates generally to furnaces, and is particularly concerned with furnaces for heat treating glass in a glass tempering system.

Examples of prior art furnaces are disclosed in U.S. Pat. Nos. 1,787,307; 2,215,322; 2,265,027; 2,370,381; 2,551,311; 3,295,843; 3,427,011; 3,470,624; and 3,516,649.

The tempering of glass sheets by first heating the sheet and then suddenly cooling the heated sheet increases the mechanical strength of the glass sheet, which, in and of itself, increases the safety and the use of the glass. In addition, however, the safety is increased because the tempered glass, when broken, disintegrates and shatters into small, relatively dull and harmless particles instead of into large sharp slivers as is the case with untempered glass.

Conventional glass tempering processes include systems wherein untempered glass sheets are suspended by tongs on a carrier. The carrier with the sheets supported thereon are then conveyed into a furnace and heated to a desired temperature, after which the carrier with the heated sheet is conveyed to a blasthead or quenching apparatus to suddenly cool and reduce the temperature of the glass to complete the tempering process.

During the heating of the glass in the furnace, if different portions of the glass sheet are exposed to uneven temperatures, the resulting stresses can cause warpage or breakage of the sheet. It is also desirable during the cooling process that the glass sheet be uniformly bathed by the cooling fluid (see, for example, the aforementioned U.S. Pat. No. 2,724,215). As the sheet being treated is conveyed from one stage to the other of the process, it is of course undesirable for any of the moving parts to strike obstructions and cause breakage or mechanical damage to any of the components and parts of the system. It is of course also desirable to maintain a high rate of production with the glass tempering system.

One of the objects of this invention is to provide a furnace for heat treating glass sheet material and the like wherein the exposure of different parts of the material being treated to different temperatures during the heat treating is minimized.

Another object of the invention is to provide a furnace for heat treating glass sheet material and the like having one or more doors at openings through which the material enters and leaves the furnace, which doors are constructed to cooperate with the surfaces of the furnace surrounding the openings in such a manner as to minimize heat losses.

In carrying out the foregoing, and other objects, a system according to the present invention has a treatment zone including a glass tempering furnace and a glass tempering blasthead or quenching device. A loading station is defined on one side of the treatment zone and an unloading station is defined on the other side of the treatment zone. The glass sheet material and the like to be treated is supported on a carrier, and conveying means is provided for moving the carrier through the system. The conveying means includes a drive conveyor extending from the loading station through the treatment zone to the unloading station for frictionally driving the carrier through the treatment zone, and a return conveyor for returning the carrier to the loading station from the unloading station in a path that bypasses the treatment zone.

A furnace according to the present invention may include an enclosure having top, bottom and side walls of fire brick, ceramic material or other refractory material with a transverse partition spaced between the top and bottom walls and dividing the interior of the enclosure into two zones. The upper zone is the material treating zone, and the lower zone is primarily a gas mixing and heating zone. Electrical heating elements or other sources of heat are mounted in both zones. Gas treating and distributing means is provided in the lower zone and is operable to (1) draw gas from the upper zone into the lower zone, (2) draw ambient air or other gas from the exterior of the furnace enclosure into the lower zone, (3) mix the exterior gas and gas from the upper zone to provide a mixture having a substantially homogeneous temperature, (4) heat the homogeneous mixture of gases and (5) force the heated, homogeneous mixture of gases into the upper zone past the heating elements in both zones at the sides of the furnace for uniformly heating the sheet material being treated and for pressurizing the upper zone. The gas is recirculated into the upper glass treatment zone in a manner to minimize turbulence and to maintain a substantially uniform temperature over the entire surface of the glass sheet. A differential temperature control is provided to control the temperature of the heating elements in the upper and lower zones in order to maintain an adequate, uniform temperature in the furnace during the treatment stage.

The furnace is further provided with a door for closing the inlet and outlet openings for the entry and exit of the material being treated which is made up of individual segments of refractory material that can be adjusted to accommodate irregularities on the surface surrounding the openings and minimize the loss of pressurized heated air from the upper zone.

The conveying means for the system includes a drive conveyor extending from the loading station through the furnace and blasthead to the unloading station. The drive conveyor includes rails and a chain including a series of rollers connected by links, the rollers having diameters such that the peripheries extend beyond the peripheries of the links. The active run of the chain has its rollers supported on the rails, and the carrier for the material to be treated has a slide member supported on the upper peripheries of the rollers so that movement of the chain causes the carrier to move by the frictional engagement with the rollers. Cooling means is provided for the portion of the drive conveyor extending across the slotted top of the furnace to maintain the lubricant for the roller axles at an acceptably low temperature. Air curtains impinge on the tops of the doors.

Other objects, advantages and features of the invention will become apparent from the following description taken in connection with the accompanying drawings in which:

FIG. 7 is an elevational view of one of the furnace doors as viewed on lines 7—7 of FIG. 1;

FIG. 8 is a detailed view of one segment of the furnace door as viewed on lines 8—8 of FIG. 7;

FIG. 9 is a sectional view taken along lines 9—9 of FIG. 7;

Figure 1:
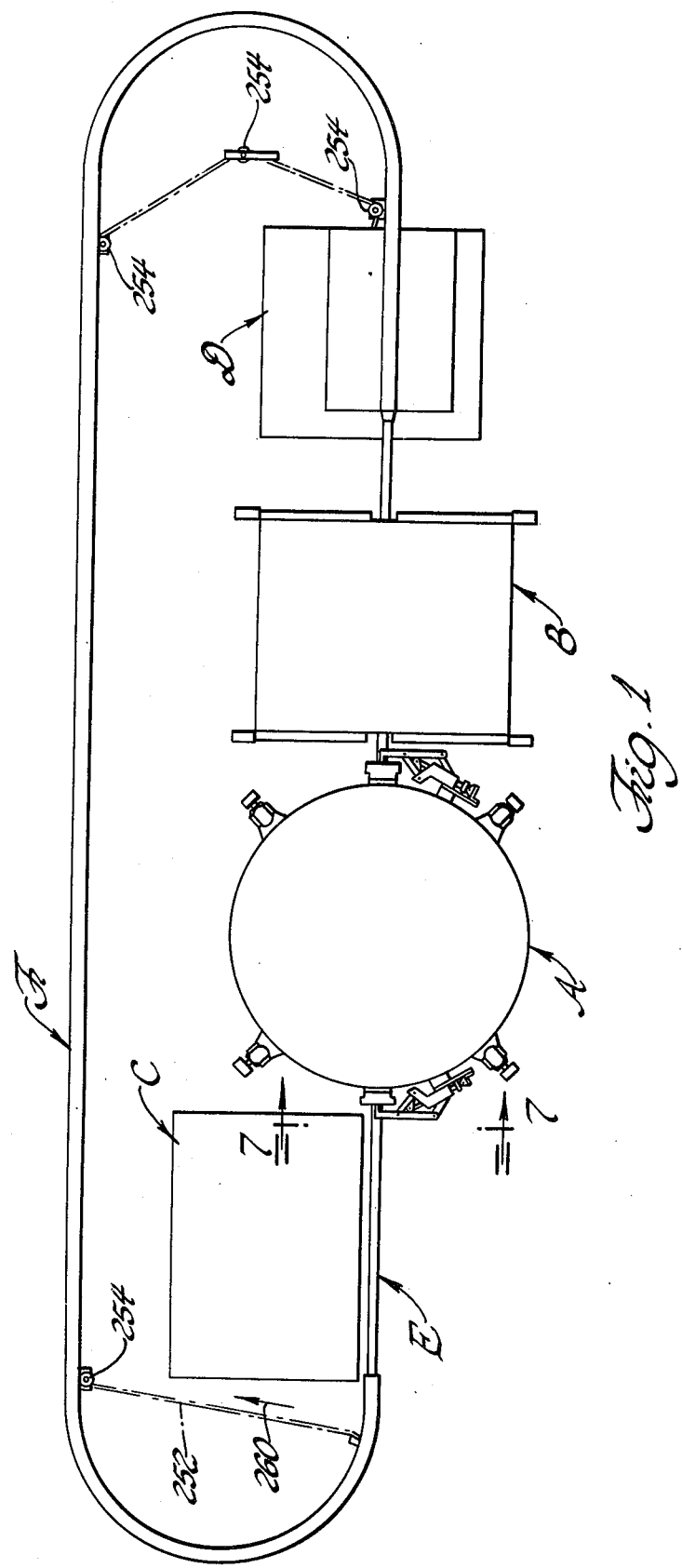
FIG. 1 is a plan view of an entire system for treating glass sheet material and the like embodying the invention.

FIG. 1 illustrates a system including a treatment zone for glass sheet material and the like comprised of a furnace collectively designated by reference character A and a blasthead collectively designated by reference character B. A loading station C is defined at one end of the treatment zone, and an unloading station D is defined at the other end of the treatment zone. Glass sheets to be tempered by the furnace A and blasthead B are loaded onto a conveying system at the loading station C and are removed from the conveying system at the unloading station D after the tempering operation is completed. The conveying system includes a drive conveyor designated collectively by reference character E extending from the loading station C through the treatment zone to the unloading station D, and a return conveyor F. The glass sheets G (FIGS. 3 and 4) are suspended from carriers designated collectively by reference numeral 2 by a plurality of tongs 4. The tongs 4 may be of conventional construction, several types of such tongs being disclosed in the above-referred to U.S. Patents. The glass sheets G are placed on the carriers 2 by the tongs 4 at the loading station C, and the drive conveyor E moves the carrier 2 with the glass sheet G suspended therefrom through the treatment zone to the unloading station D in a manner set forth in greater detail below. When the treated sheet of glass G is removed from the carrier 2 at the unloading station D, the return conveyor F carries the carrier 2 from the unloading station D to the loading station C for another treatment cycle.

Figure 2:
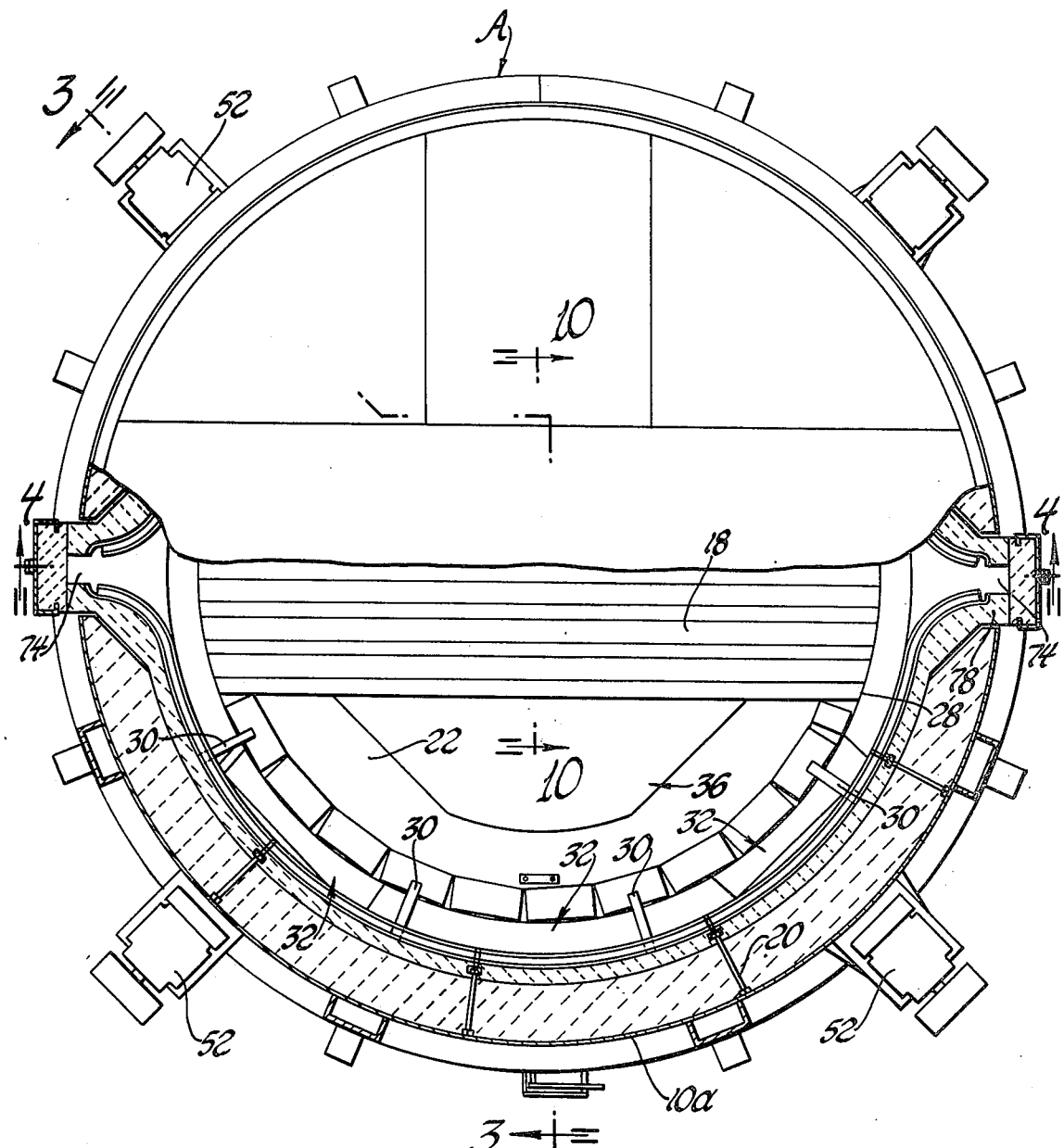
FIG. 2 is a top plan view, partially in section, of a heat treating furnace embodying the invention and of the type that may be used in the system shown in FIG. 1.
Figure 3:
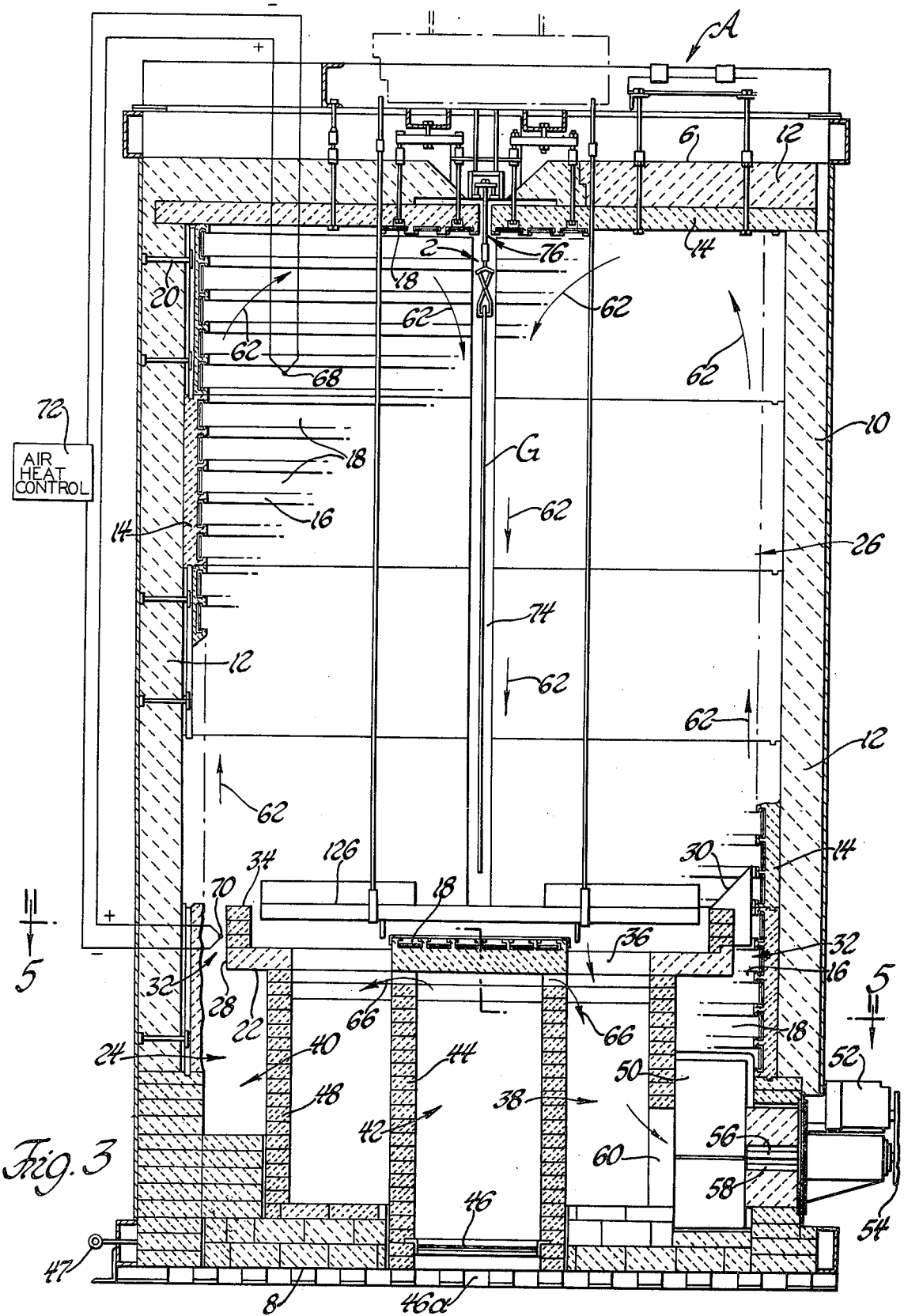
FIG. 3 is a sectional elevational view of the furnace of FIG. 2 taken on the lines 3—3 of FIG. 2.
Figure 4:
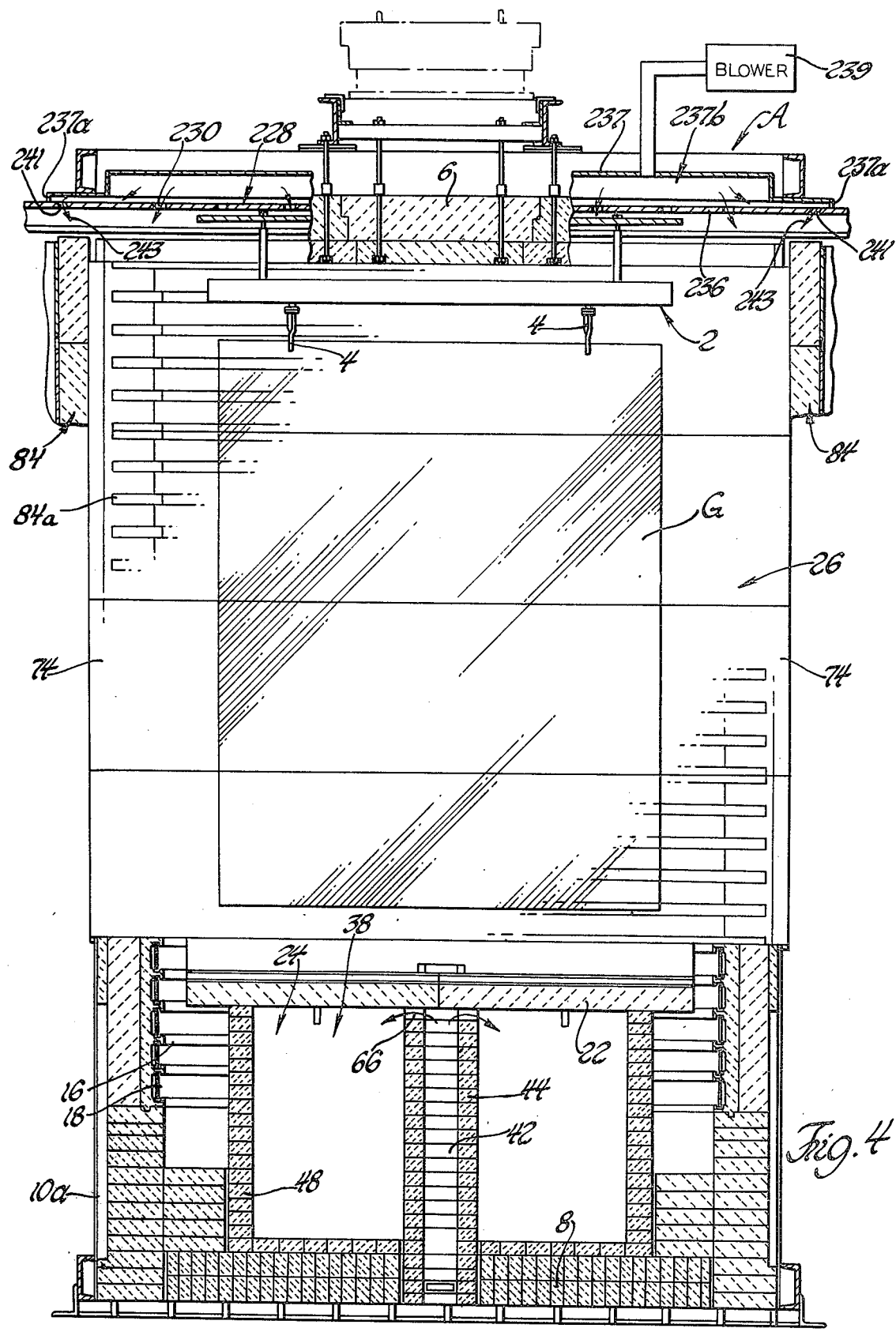
FIG. 4 is a sectional elevational view of the furnace of FIG. 2 taken on lines 4—4 of FIG. 2.

The construction of the furnace A is illustrated in detail in FIGS. 2 through 9. As shown in FIGS. 3 and 4, the furnace A comprises a furnace enclosure having a top wall 6, a bottom wall 8, and a side wall 10. The top and side walls 6 and 10 are formed of an outer, insulating layer 12 of refractory material and an inner layer 14 of firebrick or other refractory material. The layers 12 and 14 may both be of castable material. The inner layer 14 of the side wall 10 are formed integrally with outwardly projecting T-sections 16. Adjacent pairs of the T-sections 16 form supports for electrical heating elements 18. The elements making up the layers 12 and 14 are cast with appropriate openings and recesses for receiving rod connectors 20 of conventional construction for securing the layers 12 and 14 together, and to the shell 10a.

A transverse partition 22 (FIGS. 3 and 4) is spaced between the top and bottom walls 6 and 8 and divides the interior of the enclosure into a first, or lower gas or air heating zone 24, and a second, upper glass heating zone 26. The heating elements 18 in the side wall 10 are located in both the lower and upper zones 24 and 26, respectively.

As is pointed out in greater detail below, gas or air treating and distributing means is located in the first, lower zone 24 which is operable to (1) draw relatively low temperature gas from the lower portion of the second, upper zone 26 into the lower zone 24, (2) draw ambient air or other gas from the exterior of the furnace A into the lower zone 24, (3) mix the exterior gas and the gas drawn from the upper zone 24 to provide a mixture having a substantially homogeneous temperature throughout, (4) heat the homogeneous mixture of gases, and (5) force the heated, homogeneous mixture of gasses into the second, upper zone 26 along the side wall to help maintain a uniform, tempering temperature on the glass sheet G located in the upper zone 26, and to pressurize the upper zone.

The entire periphery 28 of the partition 22 is spaced from the inner side wall of the enclosure, and a plurality of vanes 30 in the form of blocks of refractory material are seated on the edge of the partition and span the gap between the peripheral edge 28 and the T-sections 26. The vanes 30 are spaced from each other to define a series of slots 32 at the periphery of the partition 22. The vanes 30, as shown in FIG. 3, have a lip which seats on the upper edge of an upstanding wall 34 formed by firebrick or other refractory material around the periphery of the partition 22, except at the central portion thereof in which are mounted additional horizontal heating elements 18 (FIGS. 2 and 3).

Spaced inwardly from the periphery of the partition 22 are openings 36 for providing a passage for the gases from the lower portion of the zone 26 into the lower zone 24.

Defined in the lower zone 24 is an intake chamber 38 and a discharge chamber 40. The openings 36 communicate with the intake chamber 38, and the slots 32 communicate with the discharge chamber 40.

A chimney 42 extends between the bottom wall 8 and the transverse partition 22. The chimney 42, in the illustrated embodiment, is enclosed by a rectangular wall 44 which also defines the inner walls of the intake chamber 38. The lower end of the chimney communicated with ambient atmosphere, and an adjustable damper 46 is mounted in the chimney near the lower end thereof. The damper is adjusted by a handle 47 (FIG. 5) mounted on the end of a rod 49 extending through the lower side wall of the furnace. A vertical wall 48 surrounds the chimney 44 and defines the outer wall of the intake chamber 38 and the inner wall of the discharge chamber 40. The outer wall of the discharge chamber 40 is defined by the side wall of the furnace enclosure.

Figure 5:
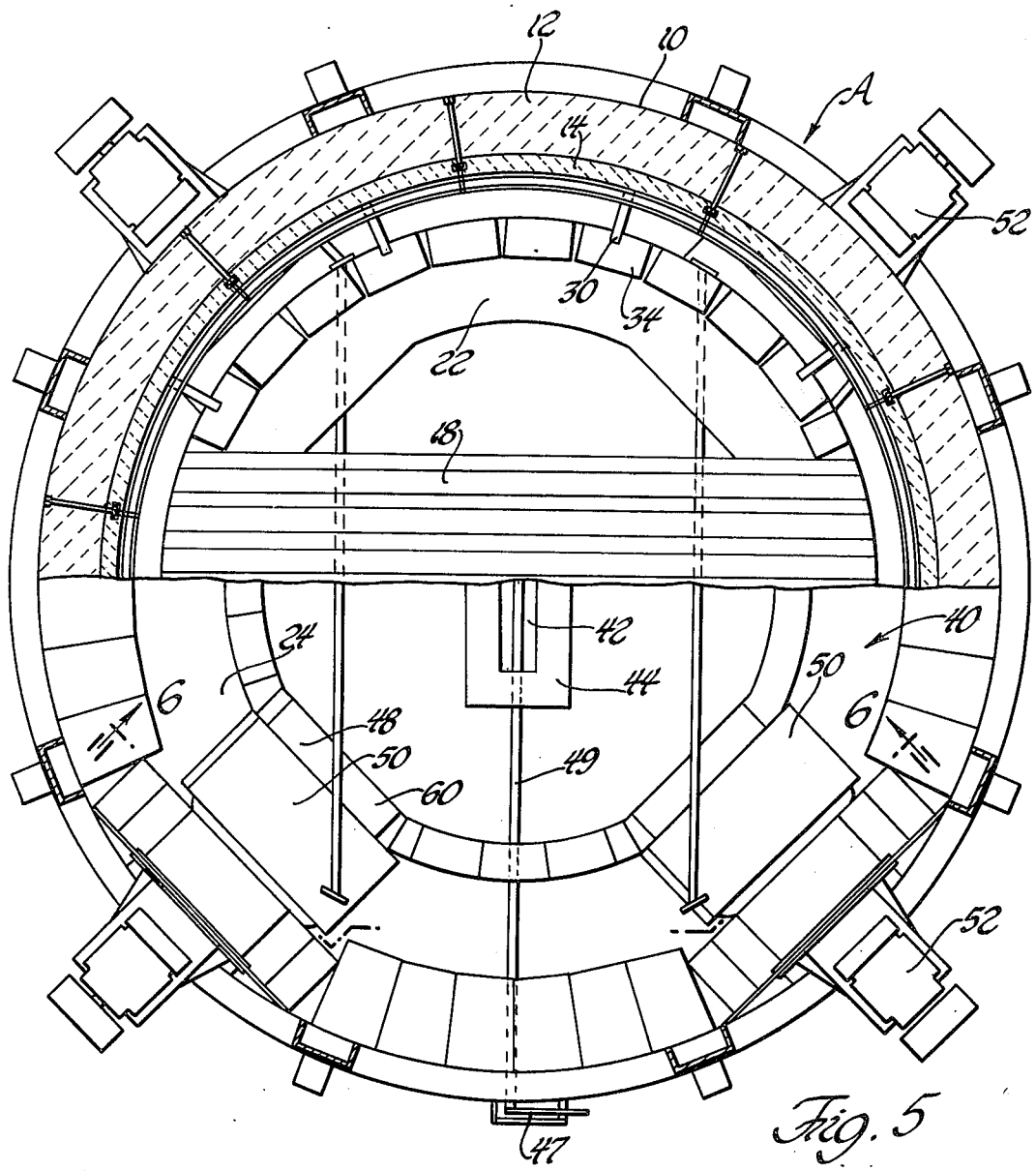
FIG. 5 is a sectional view taken approximately on lines 5—5 of FIG. 3.
Figure 6:
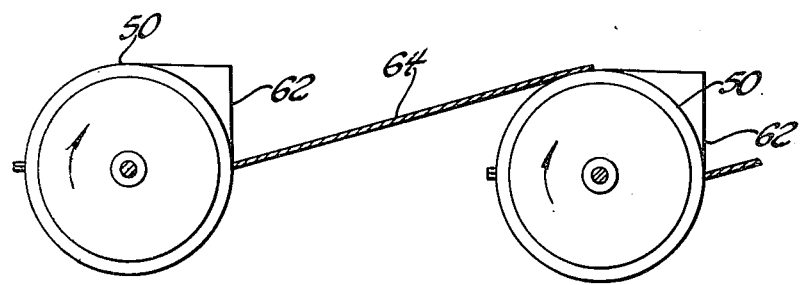
FIG. 6 is a sectional view taken approximately on lines 6—6 of FIG. 5.

A plurality of blowers 50 are mounted in the discharge chamber 24. In the illustrated embodiment, four such blowers are located within the discharge chamber 24 (FIG. 5). In the illustrated embodiment, the blowers are conventional scroll type blowers driven by motors 52 mounted externally of the furnace enclosure. In the illustrated embodiment, as shown in FIG. 3, each motor 52 drives the shaft 56 of its respective blower through gearing 54. The shaft 56 of the blower extends through an opening 58 in the side wall of the furnace enclosure. The opening 58 is of greater diameter than the shaft 56, and the shaft 56 is in unsealed relationship with the opening 58 so that operation of the blower draws ambient air through the opening 58 into the blower. The blower 50 also has its intake side connected with the intake chamber 38 through an opening 60 formed in the wall 48. Each of the blowers 50 has its discharge opening 62 directed along the length of the discharge chamber 24. As shown in FIG. 6, a ramp 64 extends from the lower end of the discharge opening 62 of one blower upwardly to the adjacent, downstream blower 50. The ramp 64 thus has its lower end disposed adjacent the discharge opening of the blower on the lower side of the discharge opening 62, and its upper end spaced from the lower end along the length of the discharge chamber and nearer to the slots 32 for deflecting the flow from the blower toward the slots into the second, upper zone 26.

As shown in FIGS. 3 and 4, a plurality of openings 66 are provided at the upper end of the chimney 42. Hence, operation of the blowers draws air through the chimney 42 and openings 66 into chamber 38 as well as from the upper zone 26 through openings 36 to the intake sides of the blowers 50. The ambient air from the chimney 42 and the openings 58 surrounding the shafts 56 of the blower is mixed with the higher temperature gases drawn through the openings 36 from the upper gas treating zone 26. The action of the blowers in the lower zone 24, together with the arrangement of the chimney, intake chamber and discharge chamber, as well as the ramp 64, thoroughly mixes and homogenizes the air or other gases in the lower zone 24 to provide a substantially uniform temperature of the gas discharged through the peripheral slots 32 past the heating elements 18. The vanes 30 deflect the gases upwardly in the direction of the arrows 62 (FIG. 3) and reduce the spiraling, turbulent motion of the gas discharged from the blowers 50.

The gases are additionally heated by the heating elements 18 in the lower zone 24 at the slots 32 so that the heated gas rises along the heating elements 18 in the side wall of the upper zone 26 toward the inner surface of the top wall 6. The gases then circulate inwardly toward the glass sheet G and then downwardly to the openings 36. The circulation is such as to provide a minimum amount of turbulence and a minimum amount of temperature differential along the surface of the glass sheet G during the time that it is disposed in the furnace A, as well as to reduce the temperature differential over the inner surfaces of the upper zone 26. Thus, the heated gases from the lower zone 24 are forced upwardly along the periphery of the glass treating zone 26 to be exposed directly to the electrical heating elements 18 located in the side wall 10, and are drawn through the intake chamber 38 by the blowers at a location spaced inwardly from the side wall 10 so that the gases move downwardly along the surfaces of the glass sheet G. As pointed out previously, the vanes 30 reduce the turbulence of the gas flowing into the upper zone 26 from the lower zone 24 and deflect the gases upwardly in a slightly spiral path.

The electrical heating elements 18 in the lower and upper zones 24 and 26 are controlled by a differential air heat controller 72. The controller 72 responds to the temperature differential between the slots 32 and the upper zone 26 as sensed by a pair of thermocouples 68 and 70. The thermocouple 68 is disposed in the upper zone 26 and the thermocouple 70 is disposed in the slot 32. If a temperature differential is sensed by the controller 72 as a result of a low temperature condition at thermocouple 70, additional energy is supplied to the heating elements 18 in the lower zone 24 to reduce or eliminate the temperature differential. The temperature of the upper zone 26 is controlled by a separate thermocouple and temperature controller (not shown).

In order to permit the glass sheet G to move through the furnace, diametrically opposed openings 74 are formed in the side wall 10. Similarly, a slot 76 extends between the openings 74 in the top wall 6 to permit the carrier 2 to pass through the furnace. With reference to FIG. 9, the inner layer 14 of silica material has end portions 78 which project beyond the insulating layer 12 and define the opening 74. The illustrated furnace A, as shown in FIGS. 2 and 5, is of substantially circular cross-section. Hence the inner layer 14 comprises two semi-circular sections in cross-section with outwardly curved and slightly thickened portions 80 terminating in the end portions 78 projecting beyond the periphery of the side wall 10. The space between the end portions 78, as pointed out previously, defines the opening 74 through which the vertically suspended glass sheet passes to enter into or exit from the furnace. Due to the low coefficient of thermal expansion of the silica material 14 held to the shell 10a by rod connectors 20, the surfaces surrounding the opening 24 maintain a constant shape at all temperatures. The T-sections 16 are also formed with outwardly curved end portions 82 conforming to the configuration of portions 80. The heating elements 18 additionally have outwardly curved portions 84a terminating at the opening 74 so that heat losses through the opening 74 are minimized when the opening is uncovered.

As pointed out previously, heating elements 18 are also provided in the top wall 6 on each side of the slot 76 (FIG. 3) to minimize heat losses through the slot 76. Additional heating elements 18 may, if desired, be mounted in the lower surface of the partition 22 at the upper end of the chimney 42 to add heat to the air in chimney 42 before it passes through the openings 66.

The openings 74 on the inlet and outlet sides of the furnace A are each controlled by doors which may be of identical construction. The construction of one of the doors is illustrated in detail in FIGS. 7, 8 and 9. Reference numeral 84 collectively designates a door movable between open and closed positions with respect to the opening 74 and which is made up of a plurality of segments 88, each adjustably secured to an elongated support bar 86.

Each of the segments 88 is comprised of a block 90 of ceramic or other refractory material, which material may be the same as the material of layer 14, supported in jackets or sheaths 92 of metal such as steel. The jackets 92 each include outwardly projecting support bar flanges 94 and inwardly projecting block engaging flanges 96 (FIG. 9). The flanges 96 are received in slots formed in the respective blocks 90 to secure the blocks to the jackets 92. The flanges 94 are formed with elongated slots 98, and conventional bolts 100 are inserted through openings in the support bar 86 aligned with the slots 98 to secure the segments 88 individually to the support bar 86. The slots 98 permit the segments to be individually adjusted with respect to the support bar 86 to accommodate any irregularities in the surfaces of the projections 78 with which the door is engaged when it is in the closed position as shown in FIG. 9 so that each segment 88 may have as tight a fit as possible with the projections 78 to assure a minimum loss of heat when the doors are closed.

Two of the segments 88 are designated in FIG. 7 by reference numerals 88a and 88b. Door actuating arms 102 are secured to the support bar 86 at segments 88a and 88b. The actuating arms 102 are each welded to plates 104 which in turn are secured by conventional bolts 106 to the support bar 86. Slotted openings are provided either in the support bar 86 or plates 104 to permit adjustment of the segments 88a and b in the same manner as the remaining blocks 88. The actuating arm 102 is pivotally connected at spaced points to the ends of parallel links 108 and 110. Link 108 has its other end nonrotatably secured to a rod 114, and link 110 has its other end nonrotatably secured to a rod 112. Rods 112 and 114 are rotatably supported at their upper end to a bracket 116. Rod 112 is rotatably supported at its lower end in a bracket 120 and rod 114 is rotatably supported at its lower end in a bracket 118.

The door 84 is moved between its open and closed positions by a hydraulic ram 122 having its cylinder end pivotally connected at 123 to a bracket 125 and its piston end pivotally connected to an operating lever 124 nonrotatably secured to rod 114. When the ram 122 is retracted from the position shown in FIGS. 7 and 9, the links 108 and 110 pivot about the axes of the respective rods 114 and 112 in a counter-clockwise direction to move the door 84 away from the opening 74.

In summary, FIGS. 3 through 9 illustrate a furnace having a substantially circular cross-section with a plurality of blower units 50, 52 disposed about the periphery of the furnace in a zone below and separated from the glass treating zone 26. Make-up air can be supplied through the rectangular chimney 24 and its openings 66 in addition to recirculating the air from the glass treating upper zone 26 past the heating elements 18 at the sides of the furnace. Furthermore, the layer or blocks 14 of material at the top or roof of the furnace is also integrally formed with T-sections 16 forming grooves into which the elongated heating elements 18 at the roof of the glass treating zone 26 can be slipped into and secured into place. When the blowers are operating, make-up air can be drawn into the furnace through openings 46a at the lower end of the chimney 42 at a rate depending upon the position of the adjustable camper 46. The ramps 64 associated with the blowers 50 (FIG. 6) serve to mix and recirculate the air upwardly and tangentially toward the return passages defined by the slots 32, while the vanes or blocks 30 deflect the recirculated air vertically and somewhat tangentially along the side walls of the furnace and the heating elements 18 located at the side walls. The openings 58 surrounding the blower shaft also prevent overheating of the blowers when the blowers are not operating because the chimney effect causes outside air to always be drawn through the openings 58 to cool the blowers.

Again referring to FIG. 3, reference numeral 126 designates a collection tray suspended from the top or roof 6 of the furnace by rods 128. The tray 126 collects any pieces of glass that are broken during the heat treating process and facilitates removal of the broken glass from the furnace and prevents the pieces from falling into places of difficult access in the furnace.

Figures 10, 10A:
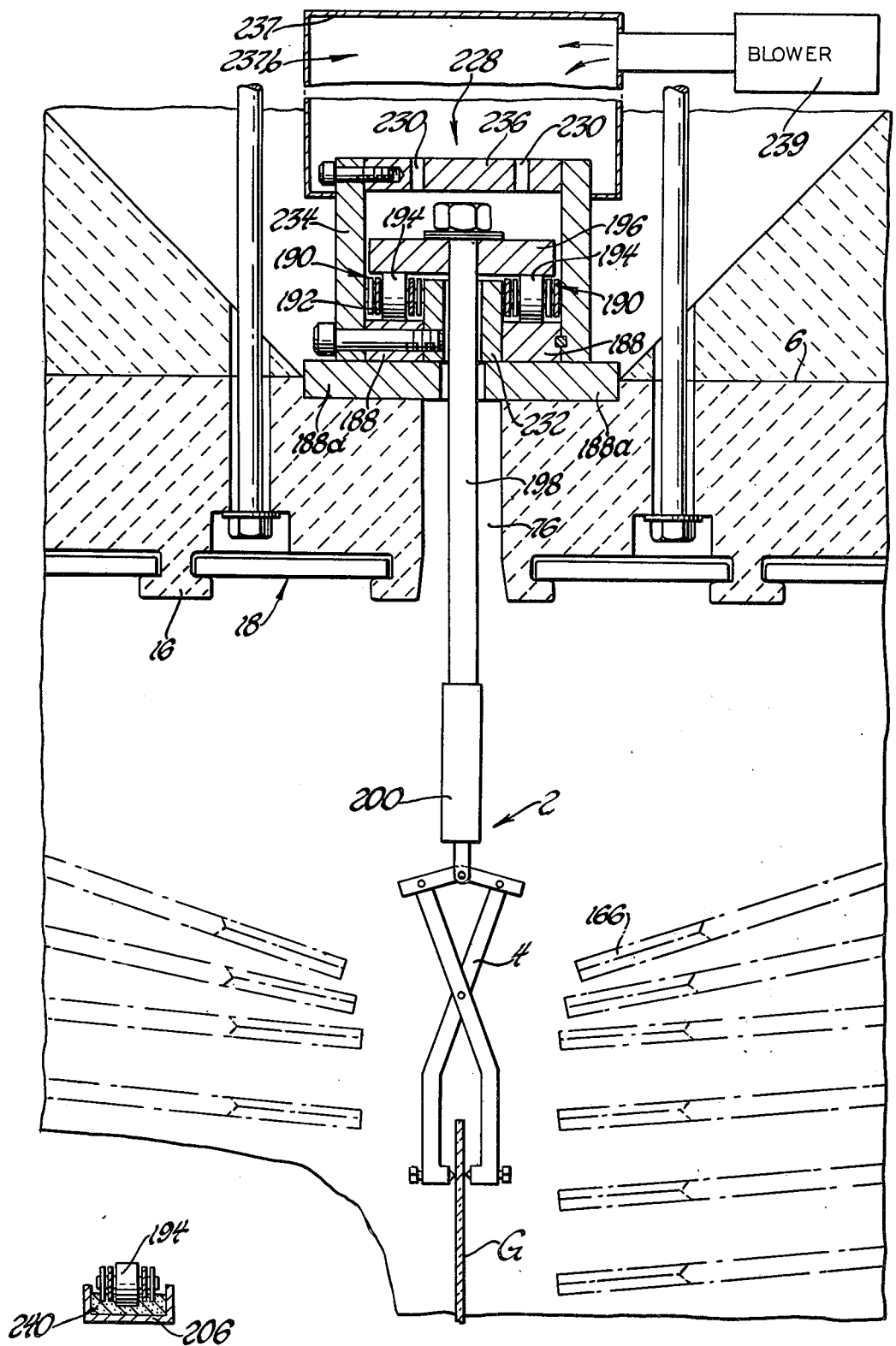
FIG. 10 is a composite sectional view illustrating the drive conveyor with a sheet of glass located within the furnace along lines 10—10 of FIG. 2, and also illustrating in phantom lines a portion of the blasthead nozzles in a different plane.
FIG. 10a is a sectional view of channel-shaped return rails for the drive conveyor chains and friction material in the return rails being applied to the peripheries of the rollers of the chain.

With reference primarily to FIG. 10, the drive conveyor for moving the carrier 2 from the loading station through the treatment zone (furnace A and blasthead B) includes a pair of spaced parallel rails 188 extending from the loading station C to the unloading station D. The rails 188 are each seated on a strip 188a, the strips 188a being spaced from each other but having their opposed inner edges projecting over the slot 76 so that a smaller slot is defined between the strips 188a. FIG. 10 illustrates the portion of the conveyor located on the roof or top 6 of the furnace. The drive conveyor further includes a pair of endless, flexible members 190 each having an active run slidably supported on one of the rails. The endless, flexible members 190 are in the form of a chain having links 192 and rollers 194. The diameter of each of the rollers is greater than the width of the links so that the rollers support the active runs of the chains 190 on the respective rails 188, and the upper peripheries of the rollers project beyond the upper edges of the links.

Each of the carriers 2 comprises a pair of slide members 196 which, as shown in FIG. 10, is supported on the rollers 194 of the chains 190 and extends across the space between the rails 188. Depending from each slide member is a suspension member 198 which extends through the slot between the rails. A material supporting bar 200 is supported on the suspension members 198, and the tongs 4 are mounted on the material supporting bar 200. As shown in FIG. 10, the suspension members 198 also extend through the slot 76 in the top wall 6 of the furnace, and the material supporting bar 200 is received in the furnace.

With the slide members 196 supported on the peripheries of the rollers 194, and the rollers 194 also supported on the rails 188, advancement toward the right as viewed in FIG. 4 causes the rollers 194 to rotate about their respective axles 195, which axles also form the pivotal connection between the ends of the links 192. In other words, the links 192 are pivotally connected in end to end relationship by the axles 195 of the adjacent rollers. The rotation of the rollers 194 causes the slide members 196 to move toward the right due to the frictional engagement between the slide members and the rollers 194 on which the slide members are supported, and only the links 192 are supported on the axles. Furthermore, with no slippage between the rollers and slide members, the slide members 196 move twice as far as the links 192.

The active runs of the drive conveyor chains on which the slide members 196 are supported extend through an external enclosure 228. As shown in FIG. 10, the enclosure 228 includes inner and outer side walls 232 and 234, and a top wall 236 extending between the side walls 234. The external enclosure 228 closes the slot 76 in the top wall of the furnace to act as a seal to prevent hot gases from escaping from the furnace. The portion of the top wall 236 of the enclosure 228 that extends across the top of slot 76 is formed with a plurality of openings 230 for the admission of air or other cooling fluid to reduce the temperature to a level commensurate with maintaining proper lubrication of the axles of the rollers 194. The admission of air under pressure through the openings 230 pressurizes the enclosure 228 to further prevent the escape of hot gases from the furnace through the slot 76.

As shown in FIGS. 4 and 10, a housing 237 is mounted on the portion of the enclosure 228 that extends across the top of the furnace and overlies slot 76. The housing 237 has ends 237a (FIG. 4) and defines a cooling chamber 237b connected with a blower 239 for supplying the chamber 237b with cooling air and pressurizing the chamber 237b. The cooling air from chamber 237b is admitted into the enclosure 228 through the openings 230. A pair of slots or series of openings 241 are formed in the top wall 236 of the enclosure. The slots or openings 241 extend substantially the entire width of the top wall 236 and are inclined downwardly and inwardly at locations overlying the upper ends of the doors 84 when the doors 84 are in their closed positions. The slots or series openings 241 are smaller than the openings 230 so that the velocity of air flowing through slots 241 from chamber 237b into the enclosure 228 is greater than the velocity of the air flowing through openings 230. Consequently, a continuous air curtain 243 is formed by the air flowing through slots 241, which air curtain extends throughout the width of the enclosure 228. The air curtains 243 help to confine the air in the enclosure 228 between the slots 241 and maintain a pressure over the slot 76 from the blower 239 that reduces the flow of hot gases upwardly through slot 76 from the furnace. The slots are also inclined downwardly and inwardly so that the air curtains 243 impinge on the upper ends of the doors 84 in their closed positions to thus reduce the leakage through any gaps between the tops of the doors and the furnace.

In order to maintain adequate frictional engagement between the rollers 194 and the slide members 196, the system includes means for applying friction material to the peripheries of the rollers to reduce slippage between the rollers and the slide members. The means for applying friction material includes the channel-shaped return rails 206 with powdered friction material received therein as illustrated in FIG. 10a. The inactive run of the chain on its return movement to the loading station end of the drive chain passes through the channels 206 and the powdered friction material contacts and adheres to the peripheries of the rollers. The powdered friction material is indicated by reference numeral 240 in FIG. 10 and may be plaster of paris or similar material. The powder 240 also serves to remove lubricant from the peripheries of the rollers 194 to reduce the slippage between the rollers and the slide members 196.

In operating of the entire system, a plurality of the carriers 2 are mounted on the conveying means E and F. When the system is started into operation, the return conveyor chain 252 runs in phased relationship with the drive conveyor chain 190 which advances a selected distance at timed intervals.

When a carrier 2 is pushed onto the loading station end of the drive conveyor E by the return conveyor chain 252, an operator can secure glass sheets to be treated to the tongs 4 on the material supporting bar 200. The glass sheet G can be secured to the carrier 2 during the dwell period of the drive conveyor, however, should additional time be needed to complete securing of the sheet to the carrier, the operator can prevent the carrier from advancing with the drive chain 190 by simply holding the carrier against movement and letting the chain override the slide members 196 of the carrier. When a sheet is loaded onto the carrier, and the dwell period ends, the doors 84 of the furnace open and the carrier is conveyed onto the furnace through the opening 74 on the inlet side of the furnace by the drive chain 190. The carrier is conveyed into the furnace into the position shown in FIG. 4 where it stops for another dwell period. When the carrier reaches the position shown in FIG. 4, the doors 84 close and the glass sheet G is heated to its tempering temperature. At the end of the dwell period, the doors 84 open, and the carrier 2 within the furnace is conveyed through the opening 74 on the outlet side of the furnace A into the space between the blasthead nozzles 166, which nozzles are illustrated in phantom lines in FIG. 10. The carrier 2 remains in the blasthead for the next dwell period. The glass sheet G and carrier 2 is then conveyed by the drive conveyor from the blasthead B to the unloading station D for removal of the glass sheet G from the carrier by an operator. The carrier is then in a position to be engaged by the return conveyor chain 252 and is conveyed back to the loading station C.

Figure 11:
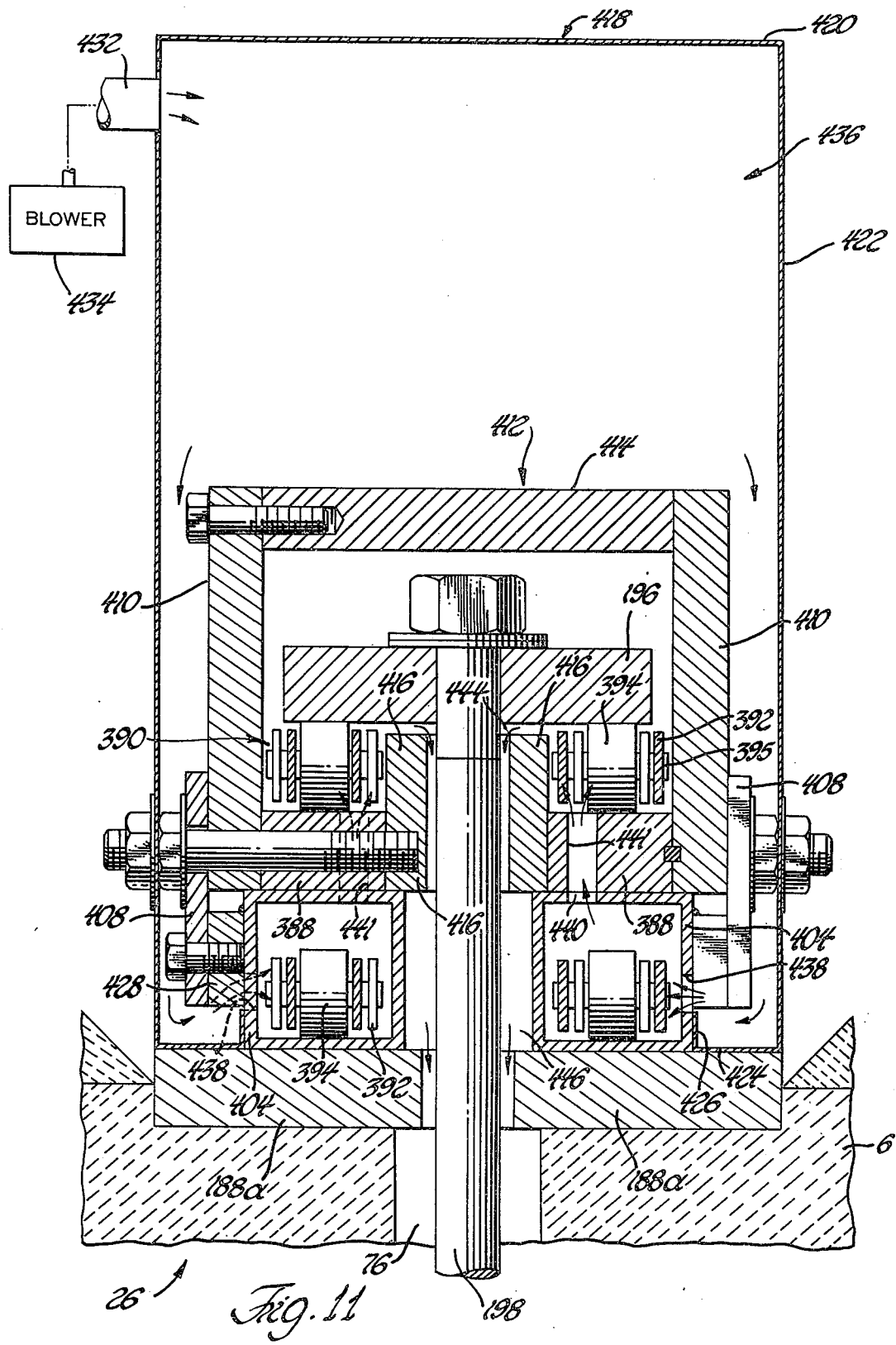
FIG. 11 is a sectional view of the furnace top similar to FIG. 10 illustrating another form of conveyor and conveyor cooling system embodying the invention.

FIG. 11 illustrates an alternative construction for the drive conveyor and conveyor cooling system. The drive conveyor of FIG. 11 includes a pair of chains 390 identical to the chains 190 of the previously described embodiment. A pair of spaced parallel rails 388 (FIG. 11) each support the upper, active run of the chains 390. The chains 390 each include links 392 and rollers 394. The links 392 are connected in end to end pivotal relationship by pins 395 forming the axles for the rollers 394.

The lower, inactive runs of the chains 390 extend through tubular return guide members 404. As shown in FIG. 11, the tubular return guide members 404 are seated on the strips 188a and completely enclose the return or inactive runs of the chains 390. The guide members 404 are of square or rectangular cross-section as shown in FIG. 11 and are secured by connectors 408 to the outer side walls 410 of an enclosure 412 for the upper, active runs of the chains 390. The enclosure 412 extends from the loading station through the treatment zone to the unloading station.

The enclosure 412 includes a top wall 414 extending between the outer side walls 410 and a pair of spaced, inner side walls 416, the rails 388 each being located between adjacent pairs of the outer and inner side walls 410 and 416, respectively.

The portion of the enclosure 412 that extends across the treatment zone is received in a housing or shroud 418. The shroud 418 has a top wall 420, side walls 422 extending downwardly from the top wall, and bottom walls 424 extending inwardly from the lower ends of the side wall 422 and seated on the strips 180a. The bottom walls 424 have upturned, inner flanges 426 engaging the sides of the tubular guides 404, the upper ends of the guide members terminating beneath spacers 428 at each of the connectors 408. The shroud or housing 418 has end walls 430 which are located approximately in the same position with respect to the furnace doors 84 as the end walls 237 a of the housing 237 of FIG. 4.

The housing 418 is connected through conduit 432 with a blower 434. The housing 418 defines a pressure chamber 436 for supplying cooling air (or other fluid) to the portions of the chains 390 passing over the slot 76. The pressure in chamber 436 also acts against the pressure in the furnace to reduce the loss of heat through slot 76. The pressure in chamber 436 tends to balance the pressure in the upper heating zone 26 of the furnace so that there is a minimum amount of transfer of fluid through slot 76 in either direction.

Formed in the outer side walls of the tubular guide members 404 is a series of openings 438. The series of openings 438 extends throughout the length of the tubular guide members 404 that is enclosed by the housing 418. Similarly, a series of openings 440 are formed in the top wall of the guide members 404 along the lengths of the guide members enclosed by the housing 418. A series of openings 441 are also formed along the lengths of the rails 388, and each of the openings 440 is aligned with one of the openings 441. Consequently, air from the chamber 436 flows through the openings 438, 440 and 441 to the enclosure 412. The cooling air from the blower 434 is under pressure, and flows into the space between the inner side walls 416 of the enclosure 412 as is indicated by the arrow 444 in FIG. 11, and the pressure acts downwardly as indicated by the arrows 446 toward the slot 76. As a result, a pressure boundary is provided between the cooling air from the blower 434 and the hot gases from the heating zone 26 of the furnace at the slot 76. The chains 390 are thus not subjected to the high temperature from the furnace, and consequently, adequate lubrication can be maintained between the rollers 394 and their respective axles 395 since the blower 434 is able to maintain a sufficiently low temperature on the chains to prevent loss of lubrication. As in the previously described embodiment, friction material such as plaster of paris may be provided in the tubular guide members 404 to remove any lubricant from the peripheries of the rollers 394 and also to reduce the slippage between the rollers 394 and slide member 196 as the carriers move through the furnace.

While specific forms of the invention have been illustrated and described in the foregoing specification and accompanying drawings, it will be apparent to those skilled in the art that the invention is not limited to the exact construction shown, and that alterations and modifications in the construction and arrangement of parts, all falling within the scope and spirit of the invention, can be made by those skilled in the art.

We claim:

1. A furnace for heat treating glass sheet material and the like comprising: a furnace enclosure having top, bottom and side walls of refractory material; a partition dividing the interior of said furnace enclosure into first and second zones; heating means in both of said zones; and gas treating and distributing means in said first zone; said gas treating and distributing means including an intake chamber communicating with a low temperature area of said second zone and with ambient atmosphere, a discharge chamber communicating with an area of said second zone spaced from said low temperature area with which said intake chamber communicates, at least a portion of the heating means in said first zone being located in said discharge chamber, and at least one blower having its intake side connected with said intake chamber and its discharge side connected with said discharge chamber; said gas treating and distributing means being operable to (1) draw gas from a low temperature area of said second zone into said first zone, (2) draw ambient gas from the exterior of said enclosure into said first zone, (3) mix the exterior gas and gas from said second zone to provide a substantially homogeneous temperature throughout the mixed gases, (4) heat the homogeneous mixture of gases, and (5) force the heated, homogeneous mixture of gases into said second zone.

2. A furnace as claimed in claim 1 wherein said partition extends transversely between said top and bottom walls, said second zone is defined between said top wall and said transverse partition; and said first zone is defined between said bottom wall and said transverse partition.

3. A furnace as claimed in claim 2 wherein a series of slots is defined at the periphery of said transverse partition to provide communication between said zones.

4. A furnace as claimed in claim 3 wherein said gas treating and distributing means is arranged to force the heated, homogeneous mixture of gases into said second zone through said series of slots.

5. A furnace as claimed in claim 4 wherein said second zone becomes pressurized by said gases.

6. A furnace as claimed in claim 5 wherein the peripheral edge of said transverse partition is spaced from the inner side wall of said enclosure, and a plurality of vanes are seated on said transverse partition and span the gap between the peripheral edge of said transverse partition and the inner side wall of said enclosure to define said series of slots.

7. A furnace as claimed in claim 6 including an opening in said transverse partition spaced inwardly from the peripheral edge thereof providing communication between said low temperature area of said second zone and said intake chamber.

8. A furnace as claimed in claim 7 wherein said discharge chamber communicates with said second zone through said slots.

9. A furnace as claimed in claim 8 including a motor for said blower mounted externally of said furnace enclosure; a shaft opening in said wall; the shaft of said motor extending through said shaft opening to drive said blower; said shaft opening being larger than said shaft and said shaft being in non-sealed relationship with said shaft opening such that outside, ambient gas is drawn through said shaft opening.

10. A furnace as claimed in claim 9 wherein said gas treating and distributing means includes a chimney extending between said bottom wall and the lower surface of said transverse partition, the lower end of said chimney communicating with ambient atmosphere, the walls of said chimney defining the inner walls of said intake chamber; a vertical wall surrounding said chimney and spaced between said chimney and the side wall of said enclosure and extending between said bottom wall and said transverse partition to define the outer wall of said intake chamber.

11. A furnace as claimed in claim 10 including at least one opening in the wall of said chimney connecting the interior of said chimney with said intake chamber so that ambient gas is drawn into said intake chamber through the opening in said chimney during operation of said blower.

12. A furnace as claimed in claim 11 further including an adjustable damper in said chimney for controlling the rate of flow through said chimney.

13. A furnace as claimed in claim 11 wherein the opening in said transverse partition communicates with the space between said chimney and said vertical wall surrounding said chimney.

14. A furnace as claimed in claim 13 wherein said vertical wall surrounding said chimney cooperates with the side wall of said furnace enclosure to define said discharge chamber; said blower being connected with said intake chamber through an opening in said vertical wall.

15. A furnace as claimed in claim 9 further including a ramp in said discharge chamber having a lower end and an upper end spaced from said lower end, said lower end being disposed adjacent the discharge opening of the blower at the lower side of said discharge opening, and the upper end being spaced along the length of said discharge chamber from said lower end and nearer to said slots than said lower end for deflecting gases from said blower toward said second zone.

16. A furnace for heat treating glass sheet material and the like comprising: a furnace enclosure having top, bottom and side walls of refractory material; an inlet and outlet in the side walls and a slot in the top wall; a material carrier movable through said inlet, said slot and said outlet for carrying material to be treated through said furnace; a housing overlying said slot and defining a pressure chamber in communication with said slot, and further including means for supplying fluid pressure to said housing to provide a fluid pressure barrier at said slot to resist escape of gases from said furnace through said slot, the pressure of the gases in said chamber also providing a resistance to the flow of fluid pressure from said housing into said furnace through said slot.

17. A furnace as claimed in claim 16 further including an external enclosure extending across said top wall and overlying said slot, said external enclosure extending through said housing and being in fluid communication with the pressure chamber defined by said housing.

18. A furnace as claimed in claim 17 further including inlet and outlet doors for said inlet and outlets, respectively; a pair of air curtain openings in said external enclosure; the tops of said doors being disposed beneath and in the path of said air curtains in their respective closed positions such that the air curtains impinge on the tops of the doors, when said pressure chamber is pressurized, to reduce the leakage of gases from within the furnace at the tops of the doors.

19. A furnace as claimed in claim 17 further including conveying means extending through said furnace enclosure for conveying said carrier through the furnace.

20. A furnace for heat treating glass sheet material and the like comprising: a furnace enclosure having top, bottom and side walls of refractory material; means defining a glass treatment zone in said furnace enclosure, said top wall defining one wall of said treatment zone; an inlet and an outlet in the side wall; heating means in said glass treatment zone; a slot in said top wall extending between said inlet and outlet; an inlet door movable between open and closed positions with respect to said inlet; an outlet door movable between open and closed positions with respect to said outlet; an external enclosure overlying said slot and extending along the length of said slot on the upper side thereof from said glass treatment zone; means for supplying fluid pressure to said external enclosure to provide a pressure barrier at said slot to resist escape of gases from said glass treatment zone through said slot into said external enclosure; and means for pressurizing said glass treatment zone.

21. A furnace as claimed in claim 20 further including a gas treating zone in said furnace enclosure, said means for pressurizing said glass treatment zone comprising gas treatment and distributing means in said gas treating zone operable to (1) draw gas from a low temperature area of said glass treatment zone into said gas treating zone, (2) draw ambient gas from the exterior of said enclosure into said treating zone, (3) mix the exterior gas and gas from said glass treating zone to provide a substantially homogeneous mixture of gases, (4) heat the homogeneous mixture of gases, and (5) force the heated, homogeneous mixture of gases into said glass treating zone.

22. A furnace as claimed in claim 21 further including means for providing an air curtain on the tops of said inlet and outlet doors in the respective closed positions thereof to reduce the leakage of gases at the tops of said doors.

23. A furnace as claimed in claim 22 wherein said side walls have an outer insulating layer and an inner layer of material having a low coefficient of thermal expansion; said inner layer having spaced end portions projecting beyond the outer layer and the periphery of the side walls to define said inlet and outlet openings.

24. A furnace as claimed in claim 23 wherein said furnace enclosure is circular and said inner layer comprises two semi-circular sections in cross-section having slightly thickened portions terminating at said end portions.

25. A furnace as claimed in claim 24 wherein each of said doors comprises an elongated support bar, a plurality of blocks of refractory material supported on said bar in end-to-end relationship and means adjustably securing each of said blocks to said bar to accommodate irregularities in the opening controlled thereby.

26. A furnace as claimed in claim 25 wherein said last named means comprises a metal jacket for each of said blocks partially enclosing the respective block; flanges projecting from said jackets and receiving said bar; and means securing said flanges to said rod to permit selective adjustment of said block transversely of said bar.

27. A furnace for heat treating glass sheet material and the like comprising: a furnace enclosure having top, bottom and side walls of refractory material; a partition dividing the interior of said enclosure into first and second zones; heating means in both of said zones; and gas treating and distributing means in said first zone; said gas treating and distributing means including: a plurality of chambers in fluid communication with each other, one of which is also in fluid communication with a low temperature area of said second zone and ambient atmosphere and another of which is in fluid communication with a different area of said second zone, at least a portion of said heating means in said first zone being located near said different area, and blower means in fluid communication with said plurality of chambers and operable when energized to cause gas to flow through said chambers in direction from said one chamber to said another chamber; said gas treating and distributing means being operable when said heating means and blower means are energized to (1) draw gas from said low temperature area of said second zone into said first zone, (2) draw ambient gas from the exterior of said enclosure into said first zone, (3) mix the exterior gas and gas from said second zone to provide a substantially homogeneous mixture of gases, and (5) force the heated, homogeneous mixture of gases into said second zone.

28. A furnace as claimed in claim 27 wherein said one chamber comprises an intake chamber and said another chamber comprises a discharge chamber, said blower means being connected to drawn gas from said intake chamber into said discharge chamber.

29. A furnace as claimed in claim 28 wherein said blower means includes a plurality of blowers each having its intake side connected with said intake chamber and its discharge side connected with said discharge chamber.

30. A furnace as claimed in claim 29 wherein said blowers are located in said discharge chamber and are spaced from each other in said discharge chamber with their discharge sides disposed to discharge in the same direction.

31. A furnace as claimed in claim 30 further including a ramp extending between each adjacent pair of said blowers; each of said ramps having a lower end and an upper and spaced from said lower end, said lower end being disposed adjacent the discharge opening of one of said adjacent pair of blowers and said upper end being disposed adjacent the other of said adjacent pair of blowers for deflecting air upwardly from said one blower.

32. A furnace as claimed in claim 20 wherein said means for supplying fluid pressure to said external enclosure includes a housing extending along the length of said slot, and a blower connected with said housing, said external enclosure extending through said housing and being in fluid communication therewith.

33. A furnace as claimed in claim 32 wherein said external enclosure extends across the tops of said inlet and outlet doors, and including a pair of air curtain openings in said external enclosure each overlying the top of one of said doors, said housing extending past said air curtain openings, such that an air curtain impinges on the tops of the doors in their respective closed positions when said blower is operating to reduce leakage of gases from within the furnace at the tops of the doors.

* * * * *